United States Patent [19]

Saito et al.

[11] 4,269,391
[45] May 26, 1981

[54] VALVE SEALING DEVICE AND A VALVE

[75] Inventors: Tutomu Saito; Hiroshi Yamazoe; Hidenori Yamaoka, all of Yokohama, Japan

[73] Assignees: Nippon Petrochemicals Co., Ltd.; Nippon Carbon Co., Ltd.; Kitamura Valve Seizo Kabushiki Kaisha, all of Tokyo, Japan

[21] Appl. No.: 898,762

[22] Filed: Apr. 24, 1978

[30] Foreign Application Priority Data

Apr. 28, 1977 [JP] Japan ............................ 52-48392
Oct. 28, 1977 [JP] Japan ........................... 52-128593

[51] Int. Cl.³ .................................... F16K 5/06
[52] U.S. Cl. ............................. 251/315; 251/368
[58] Field of Search ............... 106/56; 75/201, 243; 428/545; 251/315, 368

[56] References Cited

U.S. PATENT DOCUMENTS

| | | | |
|---|---|---|---|
| 3,563,265 | 2/1971 | Graham | 251/315 |
| 3,592,440 | 7/1971 | McFarland | 251/315 |
| 3,907,514 | 9/1975 | Demendi | 75/243 |
| 4,004,776 | 1/1977 | Stender | 251/315 |
| 4,006,881 | 2/1977 | Gaillard | 251/214 |

FOREIGN PATENT DOCUMENTS

1517596  5/1967  France ..................... 428/545

*Primary Examiner*—William R. Cline
*Assistant Examiner*—H. Jay Spiegel
*Attorney, Agent, or Firm*—Michael A. Painter

[57] ABSTRACT

A valve sealing device is proposed consisting of two parts, one of which contacts the body of the valve and is made of an expanded graphite compact or an expanded graphite—inorganic binder composite compact, and the other of which contacts the valve member and is made of a carbonaceous material—metallic material composite, a carbonaceous material impregnated with an inorganic binder, or a metallic material; a valve using such a sealing device is also proposed.

18 Claims, 30 Drawing Figures

VALVE SEALING DEVICE AND A VALVE

This invention relates to a valve seal for a valve which is resistant to high and low temperatures and to chemical agents and therefore can be used in a wide range of fields.

A valve seal is an important component of a valve. For smooth sliding of the valve member against the valve seal, the coefficient of friction between them should be low.

Further, the valve seal, and therefore the material of which it is made, should have to as great an extent as possible the characteristics of impermeability, thermal resistance, mechanical strength, and proper rigidity. It should also be compressible and resilient.

These properties are required for the valve seals of all valves, such as ball valves, butterfly valves, plug valves (cock valves), gate valves, globe valves, check valves and so on.

A conventional valve seal made of metal is inferior in lubricating properties, sealing properties, heat resistance, and resilience.

A valve seal made of a high polymer material such as polytetrafluoroethylene (hereinafter referred to as PTFE) or the like is superior in lubricating properties, but is inferior in heat resistance and mechanical strength. In this case, there is no problem in practice when using the valve in normal temperature conditions. However, when using the valve in an application involving very low temperature conditions, for example, in controlling the flow of liquefied petroleum gas (LPG), liquefied natural gas (LNG), or the like, or when, on the other hand, using the valve in an application very high temperature conditions, for example, in control of the flow of a high temperature fluid at around 250° C., a high polymer material may become distorted, resulting in leakage of the valve seal.

I.e., when a high polymer material is heated to several hundred degrees Centigrade, as, for example, may occur in a fire, it is broken down by heat; and on the other hand this high polymer material is shrunk or destroyed by extremely low temperatures.

Further, PTFE is subject to "cold-flow" under pressure, and this may result in difficulty in maintaining the seal at high pressures. For example, a typical limit of pressure is 20 kg/cm$^2$ at 150° C.

In order to improve on these defects, asbestos, glassfiber, carbon and the like have been mixed with PTFE; however, heat resistance and mechanical strength are improved only a little by this.

If a valve seal is made of a carbonaceous material, which is a solid lubricating material, its heat resistance is improved, but it is permeable. It is inferior in mechanical strength, and accordingly the sealing surface pressure cannot be made high enough to guarantee a good seal. Further, it is worn away relatively earlier.

As an expedient to remove these defects, phenol resin or the like has been charged into the gaps or the openings of the carbonaceous material, so as to reinforce it. However, this effect can only be maintained up to operating temperatures of 200° C. or so, and only up to 300° C. even if the material is further processed by heat so as to improve its heat resistance.

It is an object of the present invention to provide a sealing material for a valve which improves on the above materials, and in which the aforementioned defects are not present to such an extent, and which has superior properties such as high and low temperature resistance and resistance to various chemical agents.

It is a further object of the present invention to provide a sealing device for a valve which maintains a good seal even in conditions of severe temperature and pressure, in particular in conditions of high temperature and of low temperature.

It is a further object of the present invention to provide a valve which is capable of maintaining a good seal against fluid pressure even in conditions of very high or very low temperatures, and which is capable of controlling fluids at high pressures.

It is a further object of the present invention to provide a sealing device for a valve, and also to provide a valve, which can function for a long time and over an operational period involving many opening and closing performances of the valve, without suffering severe deterioration of the sealing surfaces prematurely due to poor wear resistance of the sealing surfaces, even in conditions of extremely high or extremely low temperatures, and even in applications involving control of fluids at high pressures.

With these objects in view, and in order to make progress towards accomplishing at least one of them, there is provided a sealing device for a valve comprising a valve body and a valve member, which is adapted to be situated between the valve body and the valve member, comprising a valve body contact member and a valve member contact member, wherein the material from which the valve body contact member is made is selected from the group consisting of an expanded graphite compaction or compression molding (hereinafter, and in the claims, referred to simply as a "compact") and an expanded graphite—inorganic binder composite compact, and wherein the valve member contact member is made from a material which is selected from the group consisting of a carbonaceous material—metallic material composite, an inorganic-binder-impregnated carbonaceous mateiral, and a metallic material.

The present invention will now be described in more detail with reference to various embodiments illustrated in the accompanying drawings, which, however, are not intended to be limitative of the present invention, but are given for purposes of illustration only, the protection desired to be granted being delimited only by the appended claims. In the drawings:

Figure 1:
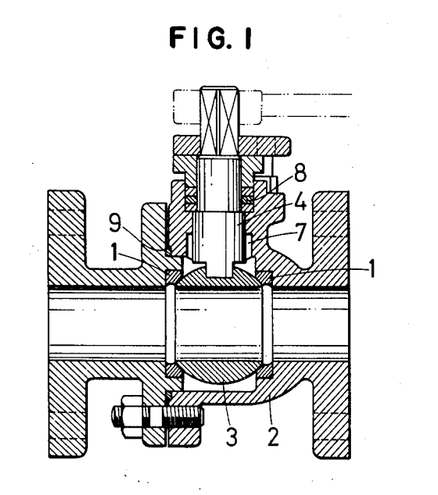
FIG. 1 is a longitudinal sectional view of a ball valve using a sealing device according to the present invention.

Referring to FIG. 1, there is shown a usual type of ball valve comprising a valve seal 1, a valve body 2, a valve member 3, a valve stem 4, a valve stem sleeve 7, a valve stem gasket 8, and a valve body gasket 9.

In FIGS. 2A-2I there are shown different embodiments of a sealing device for a valve according to the present invention, in which the sealing device comprises a valve body contact member 11 which contacts with the valve body 2, a valve member contact member 12 which is disposed as in contact with the valve body contact member 11 and which contacts the valve member 3, a reinforcing ring 13 which is provided in some cases, at least one annular groove 14 formed in some cases in the contact surface of the valve member contact member 12 where it contacts the valve member 3, and a supplementary ring 15 which is sometimes embedded in the annular groove or grooves 14.

In some of these cases the valve body contact member is fitted into a slot or recess in the valve member contact member, and in some cases it is juxtaposed to the valve member contact member and held together with it by the reinforcing ring 13. It is also possible in some cases to attach the valve member contact member to the valve body contact member by bonding or other suitable attaching means, and it would in some embodiments be possible to fit the valve member contact member into a slot or recess in the valve body contact member.

Each of the characters "a" to "i" attached to the numbers "11" to "15" represents the corresponding member when it appears in each of the embodiments shown in FIGS. 2A-2I, and similarly for FIGS. 3A-3I.

Figure 2A:
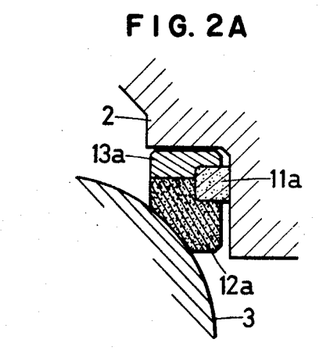
FIGS. 2A–2I are longitudinal sectional views of various sealing devices according to the present invention.
Figure 2B:
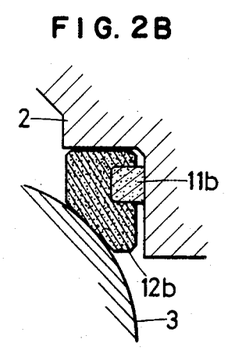
Figure 2C:
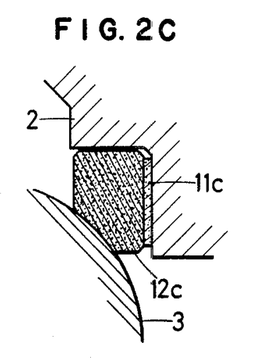
Figure 2D:
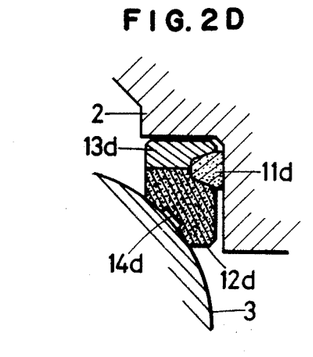

In FIGS. 2A and 2D the valve body contact member 11a or 11d is disposed in an annular groove formed outside of and between the valve member contact member 12a or 12d and the reinforcing ring 13a or 13d and projects a little outwards therefrom.

In FIGS. 2B, 2E, 2G, 2H, and 2I, the valve body contact member (or members) 11b, 11e, 11g, 11h or 11i is disposed in an annular groove formed on the outside of the valve member contact member 12b, 12e, 12g, 12h, or 12i and projects a little outwards therefrom.

Figure 2E:
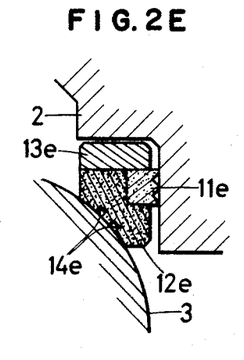
Figure 2F:
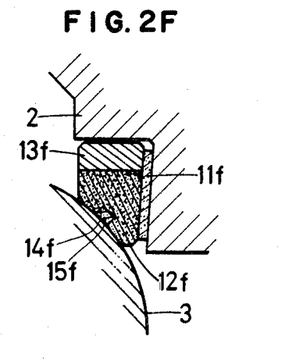

In FIGS. 2C and 2F the valve body contact member 11c or 11f is formed in a thin annular ring form and is attached to the outside of the valve member contact member 12c or 12f.

In FIG. 2D, the upper and the lower surfaces (as seen in the figure) of the valve body contact member 11d are tapered in the leftward direction in order to improve the load distribution and also in order to improve the resilience.

In FIG. 2E the valve body contact member 11e has a plurality of concentric annular grooves formed on its outside portion in order to spread the face pressure and in order to improve the sealing function.

Figure 2G:
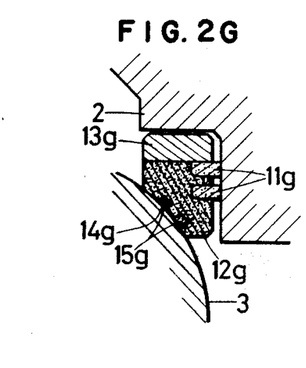

In FIG. 2G the valve body contact member 11g is divided into two parts so as to obtain better sealing even under low face pressure.

The contact surface of the valve member contact member 12 to the valve member 3 is formed in a generally arcuate form corresponding to the surface of the valve body 3, except for the flat plane of the one 12b of FIG. 2B.

In FIGS. 2D-2I one or a plurality of annular grooves 14d to 14i are formed in the contact surface of the valve member contact members 12d to 12i. The annular groove 14d to 14d have rectangular cross-section, but the annular groove 14h has only one wall and in fact occupies one half of the contact surface, being in effect a cutaway. The annular groove 14i is formed in a V-shaped form.

In FIGS. 2F and 2G the supplementary rings 15f and 15g, which may be made of the same material as the valve body contact member 11f or 11g, are inserted into the annular grooves 14f and 14g, so as to improve the sealing properties of the valve.

Referring to FIGS. 3A-3I, there are shown other sealing devices for a valve, comprising a valve body contact member 16 which contacts the valve body 2, a valve member contact member 17 which is disposed as in contact with the valve body contact member 16 and contacts the valve member 3, in some figures at least one annular groove 18 formed in the contact surface of the valve member contact member 17 and the valve member 3, and in some figures a supplementary ring 19 inserted into the annular groove 18, in the same manner as in FIGS. 2A-2I.

In these figures the valve member contact member 17 is intended to be made of metallic material, and accordingly there is no need for any such reinforcing ring 13 as in most of the embodiments illustrated in FIG. 2.

Figure 2H:
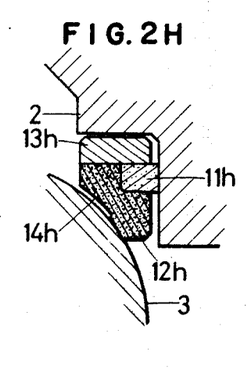
Figure 4:
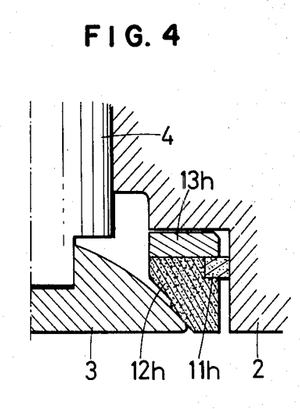
FIG. 4 is a fragmentary longitudinal sectional view of a sealing device shown in FIG. 2H, used in a ball valve.

In FIG. 4 the sealing device shown in FIG. 2H is applied to a ball valve. Detailed description is omitted for the sake of brevity of explanation.

Figure 5:
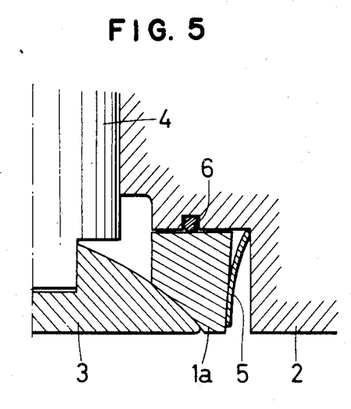
FIGS. 5 and 6 are fragmentary longitudinal sectional views of valves using conventional sealing devices.
Figure 6:
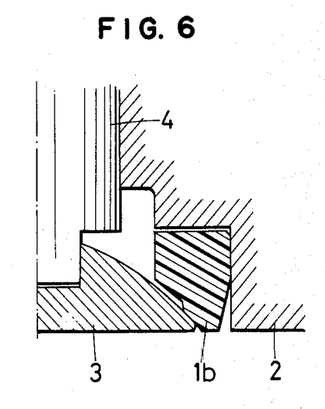

In FIGS. 5 and 6 there are shown conventional valve seals 1a and 1b of conventional valves.

In FIG. 5 the valve seal 1a is made of stainless steel, and is pushed towards the valve member 3 by a metal spring 5, and an O-ring 6 seals between the valve seal 1a and the valve body 2.

In FIG. 6 the valve seal 1b, which is made of PTFE, seals between the valve body 2 and the valve member 3.

Figure 7:
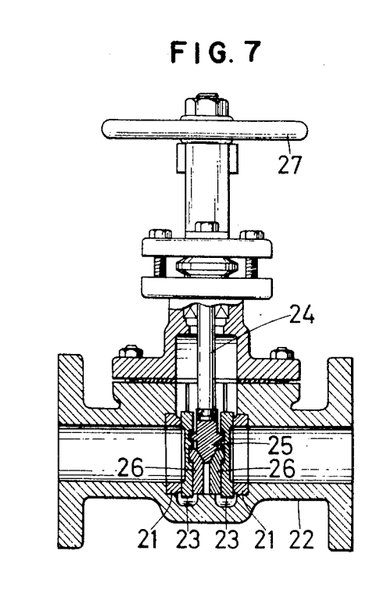
FIG. 7 is a longitudinal sectional view of a parallel slide valve using a sealing device according to the present invention.

In FIG. 7 there is shown a parallel slide valve comprising a pair of sealing devices 21 of the present invention, a valve body 22, a pair of valve members 23, a valve stem 24, a wedge 25 positioned at the end of the valve stem 24, a pair of push plates 26, and a handle 27.

As the wedge 25 is moved upwards with the valve stem 24 by turning the handle 27, the contact of the wedge 25 with the push plates 26 is broken and the valve members 23 are allowed to move towards one another, thereby opening the flow path.

On the other hand, when the wedge 25 and the valve stem 24 are moved downwards by turning the handle 27, this forces the valve members 23 apart via the push plates 26 and pushes them against the sealing devices 21, thereby closing the flow path.

Figure 8A:
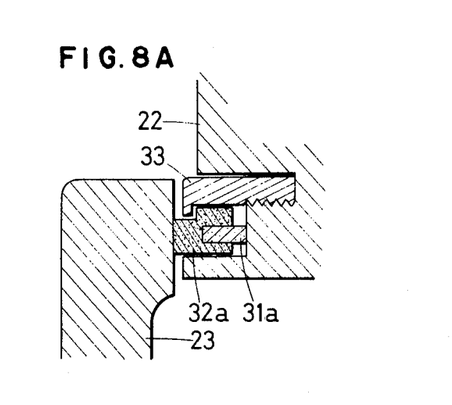
FIGS. 8A–8C are longitudinal sectional views of sealing devices for the valve of FIG. 7 according to the present invention.
Figure 8B:
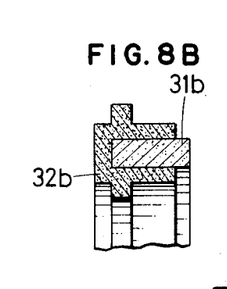
Figure 8C:
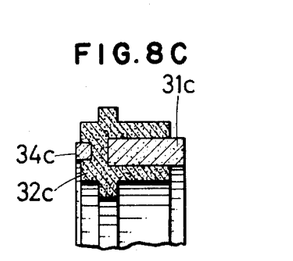

In FIGS. 8A-8C there are shown various possible forms of sealing device of the present invention that can be fitted to the valve of FIG. 7, which comprise a valve body contact member 31, a valve member contact member 32, and, in one case, a supplementary ring 34. In FIG. 8A the sealing device is mounted to the valve of FIG. 7 by an annular retainer 33 by engaging the threaded inner end portion thereof with the threaded portion of the valve body 22.

Figure 9:
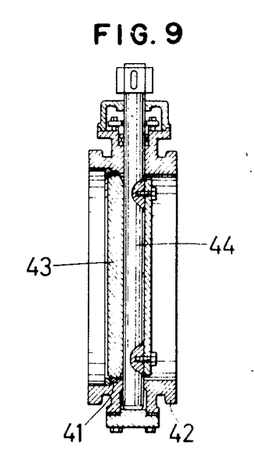
FIG. 9 is a longitudinal sectional view of a butterfly valve using a sealing device according to the present invention.

In FIG. 9 a butterfly valve of a general type is shown which comprises a sealing device 41 of the present invention, a valve body 42, a valve member 43, and a valve stem 44.

When the valve stem is rotated the valve member 43 is rotated together with it from or to the sealing device.

Figure 10A:
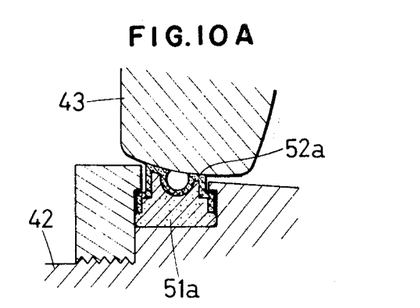
FIGS. 10A-10C are longitudinal sectional views of other sealing devices for the valve of FIG. 9, according to the present invention.
Figure 10B:
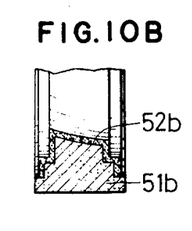
Figure 10C:
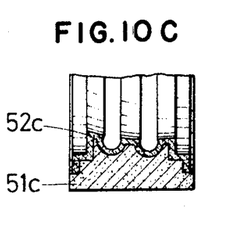

In FIGS. 10A–10C there are shown several possible sealing devices of the present invention as applied to the butterfly valve of FIG. 9, which comprise a valve body contact member 51 and a valve member contact member 52, the contact surface form of the latter with the valve member 53 being different from one figure to another.

The valve body contact members 11, 16, 31, and 51 abovementioned of the sealing devices according to the present invention are made of either:

(a) an expanded graphite compact or
(b) an expanded graphite—inorganic binder composite compact obtained by mixing expanded graphite and an inorganic binder and by compacting or compression molding the mixture.

The expanded graphite compact possesses impermeability and elasticity, and hence, when the sealing device is stressed between the valve body and the valve member, it provides good sealing function.

Expanded graphite not only has excellent thermal resistance, but also maintains its function at extremely low temperatures, and thus it may be used for a range of temperatures, ranging from high temperatures of several hundred degrees Centigrade, such as are encountered, for example, in fires, to the extremely low temperatures of LPG, LNG and the like.

Further, in order to improve mechanical strength, resilience, density, and impermeability, the expanded graphite may be used in the form of an expanded graphite—inorganic binder composite compact (b) as described above.

Especially when using the valve for high pressure fluid, the composite compact (b) is preferably utilized since better compression strength and impermeability are obtained than with compact (a) having the same density as the composite compact (b), and smaller plastic deformation during use also occurs.

Valve body contact members 11, 16, 31, and 51 made of these materials have low thermal expansion coefficients. In the wide range of temperatures from $-250°$ C. to $3600°$ C. their forms and dimensions are stable and their physical and mechanical properties do not change substantially. Accordingly there occurs no problem in sudden heating.

These valve body contact members possess excellent self-lubricating properties and corrosion resistance to acids, alkalis and organic compounds.

The other properties of the valve body contact member are controlled by determining the bulk density thereof. These valve body contact members should have a bulk density in the range of 1.1–2.1 gm/cm$^3$ and in particular preferably in the range of 1.4–1.8 gm/cm$^3$.

If the bulk density of the valve body contact member is less than 1.1 gm/cm$^3$, its strength and other properties are low. If the bulk density of the valve body contact member is more than 2.1 gm/cm$^3$, its hardness increases too much and so its resilience is low.

The bulk density is changed by controlling the compacting or compression molding pressure, temperature and time for the expanded graphite. When inorganic binder is mixed into the expanded graphite the bulk density is adjusted by controlling the three factors abovementioned and also the kind and the amount of the inorganic binder.

The inorganic binder which may be used is selected from graphitic oxide (graphitic acid), aluminium phosphate, boric acid, waterglass, colloidal silica and the like, and is preferably graphitic oxide, aluminium phosphate or colloidal silica.

The amount used of the inorganic binder should be in a range of, by weight, 1–20 parts to 100 parts of the expanded graphite, preferably 2–15 parts, and more preferably 3–10 parts.

If the inorganic binder is used in an amount of less than one part to 100 parts of expanded graphite, the strength of the expanded graphite-inorganic binder composite compact is not enough. If the inorganic binder is used in an amount of more than 20 parts to 100 parts of the expanded graphite, the hardness increases too much and thus the resilience is lowered.

The expanded graphite (a) described above is obtained as follows:

Graphite such as natural graphite, pyrolytic graphite, kish graphite or the like is treated by a strong oxidant such as concentrated sulfuric acid, concentrated nitric acid, a mixture of concentrated nitric acid and potassium chlorate, a mixture of concentrated sulfuric acid and potassium permanganate, or the like, or by a halogenated compound such as aluminium chloride or the like, to form a lemellar (interstitial) compound.

The resulting graphite particle compound in which the lemellar compound is formed is heated suddenly to more than $1000°$ C. and the lemellar compound is resolved and generates gases, thereby obtaining expanded graphite particles or vermiforms which are expanded to 10–300 times their original size in the direction of graphite lattices (C-axis direction) by the pressure of the gases generated.

The expanded graphite—inorganic binder composite compact (b) described above is obtained as follows:

The expanded graphite and the inorganic binder solution are mixed, dried, compressed, and further heated, except in the case when the binder used is graphitic oxide, when this step of further heating is unnecessary.

The graphitic oxide is preferably used in colloidal form in solution.

The boric acid may be used in a solution of methanol, ethanol, acetone or water.

The amount of the solvent used is such as to be saturated with boric acid at room temperature. The solvent is removed by natural drying, heating slowly, and then heating the mixture to more than the solvent's boiling point while stirring it, in order completely to remove all traces of solvent.

The aluminium phosphate binder used is a phosphate of aluminium such as: $Al_2O_3.3P_2O_5.6H_2O$, $Al_2O_3.3P_2O_5$, $Al_2O_3.P_2O_5$, $Al(H_2PO_4)_3$, $Al_2(HPO_4)_3$, $AlPO_4$, and $Al(PO_3)_3$, or a phosphate of aluminium including sodium, potassium, ammonia, chrome or the like, or a composition including at least two of these.

If aluminium phosphate binder is used, the expanded graphite—inorganic binder composite compact may be obtained in the same manner as in the case of boric acid as described above. Similarly for waterglass or colloidal silica.

For compacting the compact, in the case of either substance (a) or (b), a wide range of compacting pressures may be used, from 20–2000 kg/cm$^2$. In general, the greater the pressure used, the greater the density of the resulting compact, and therefore as explained above according to the density required for the particular application the compacting pressure may be chosen.

When using boric acid binder the compacting should be carried out at a temperature of at least $600°$ C., preferably in the range of 1000°–2400° C. A hot press machine may be conveniently used.

When using aluminium phosphate binder, or graphitic acid, waterglass, or colloidal silica, the compacting may be conducted at room temperature. However, the resulting compact is then to be heated to at least 500° C., preferably 600°–1300° C. This final heating stage is not necessary when graphitic acid binder is used, however.

The valve member contact members 12, 17, 32 and 52 are made of a material selected from the group of:

(c) carbonaceous material (except expanded graphite) —metallic material composite;
(d) carbonaceous material (except expanded graphite) impregnated with at least one inorganic binder; and
(e) metallic material.

The term "carbonaceous material" above includes graphite (crystalline) or graphitic carbonaceous material, and carbon (non-crystalline) or non-graphitic carbonaceous material.

If the primary object for the valve seal is a good sliding characteristic, graphite is preferably used, and if, on the other hand, the primary object is abrasion resistance, carbon is preferably used.

The term "graphite" here excludes modified graphite such as expanded graphite.

The proportion of carbonaceous material to metallic material of the carbonaceous material—metallic material composite (c) is preferably 90%–60% by volume.

If the amount of carbonaceous material is less than 60%, lubricating properties are reduced and the valve member contact member's coefficient of friction with the metal valve member increases. If the proportion of carbonaceous material is more than 90%, mechanical strength is reduced. It is preferable to have more than 1000 kg/cm$^2$ of flexural strength as the mechanical strength.

Carbon material used in the composite is produced by the following procedure.

A fine powder of pitch coke, oil coke, coal, carbon black, natural graphite or synthetic graphite having an average particle size of less than 100 mesh (149 microns), preferably less than 150 mesh (105 microns), together with an organic binder such as tar, pitch or the like, is kneaded and repulverized. The repulverized powder is compacted by compression molding and then treated by heat at 800°–3000° C. to obtain carbon blocks.

The metallic material used for the composite must have a melting point of 200°–1300° C. Al or Al alloy, or Cu or Ni alloy is preferably used in consideration of thermal resistance. Sb or Sb alloy may be used for operating temperatures of less than 400° C.

Thus the metallic material is selected from Al, Zn, Cu, Al-Cu, Al-Mg, Al-Mn, Al-Si, Al-Zn, Al-Cu-Mg, Al-Cu-Si, Al-Zn-Mg, Cu-Be, Cu-Mg, Cu-Mn, Cu-Pb, Cu-Si, Cu-Zn-Sn, Cu-Sn-P, Cu-Sn, Cu-Sn-Pb, Cu-Sn-Ni, Cu-Pb-Si, Cu-Ni-Si, Zn-Al-Cu, Sn-Zn, Sn-Al, Sn-Pb, Sn-Pb-Sb, Sn-Sb-Cu, Pt-Cd, Pb-Sb-Sn, Ag-Al, Ag-Cu, and Ag-Sn.

When producing a carbonaceous material—metallic material composite, it is important that the metallic material should be satisfactorily wettable with the carbonaceous material, for its bonding strength to the carbonaceous material to be good, which means that the contact angle of the metallic material to the carbonaceous material should be small.

In the case of Al or Al alloy, Al is satisfactorily wettable, and hence any Al alloy can be used in practice. The contact angle of Cu or Ni to carbonaceous material is however larger, and thus it is used in the form of an alloy with Sn, Zn, Si, or P. Further, in order to reduce the contact angle to the carbonaceous material, 0.5–25% by weight of Ti or Zr as a wetting agent may effectively be added to the metallic material. An experiment shows that to the maximum 25% of such a wetting agent can be effectively added.

The method of preparation of the carbonaceous material—metallic material composite will now be described.

When using fine carbon powder material, a thin steel vessel is charged with the carbon powder, covered, and hung in an autoclave over a supply of the metallic material to be impregnated into it. When the impregnating metal has been melted and heated to a temperature 50°–200° C. higher than its melting point, the vessel is lowered and immersed in the molten metal and is kept immersed therein under a pressure of 50–150 kg/cm$^2$ in an inert atmosphere such as nitrogen.

Then the molten metal penetrates from the gap between the vessel and its cover into the vessel and compacts the carbon powder therein according to a kind of isostatic pressure phenomenon, thereby obtaining a rigid composite.

When, however, a carbon block is used, it is hung above the molten metal in the autoclave, and then the pressure therein is reduced to less than 5 mm Hg so as to remove air from the pores of the carbon block. Then the block is lowered into the molten metal and kept immersed therein under pressure of an inert gas such as nitrogen, in the same way as with the carbon powder described above.

The inorganic binder impregnated carbon material (d) described above is obtained in a similar manner to the expanded graphite—inorganic binder composite compact (b). The carbon material and the inorganic binder are kneaded, molded, and further heated or baked.

Alternatively the carbon material may be molded in advance. The molded object is subjected to a partial vacuum and submerged in the binder solution. Then the pressure is raised and the binder solution is forced into the pores of the molded object. Then the solvent is evaporated at 100°–200° C., and then the object is heated to 500°–1300° C. to remove any water of crystallization that may be present.

In this case after evaporation of solvent from the pores there theoretically exist empty spaces within the object, but these may be reduced to a practically negligible amount by repeating the impregnating process. It is in practice preferable to repeat the impregnating operation at least three times, in order to obtain enough impermeability of the composite.

The latter method of mixing the inorganic binder preferably contributes much more to improvement of the abrasion resistance. The impregnated amount of inorganic binder should be 0.5% –30% by weight relative to the carbonaceous material, preferably 5%–20% by weight.

In this case it is desirable to obtain 600 kg/cm$^2$ of flexural strength as the mechanical strength.

Further, in this case, as opposed to the case of the expanded graphite—inorganic binder composite (b) described above, the inorganic binder acts as not only a binder but also as a filler of the carbonaceous material.

The filling rate, i.e. the proportion of space within the carbon filled, of the organic binder should be 70%–100%, preferably 85%–100%.

The inorganic binder used should be selected from aluminium phosphate, boric acid and colloidal silica, and particularly is preferably aluminium phosphate or colloidal silica.

The resulting inorganic binder impregnated carbonaceous material possesses well-improved abrasion resistance, mechanical strength, impermeability, corrosion resistance (particularly oxidation resistance) and the like, as compared with the carbonaceous material itself, since the vacant spaces of the carbonaceous material are impregnated with the binder.

If the valve member contact member is to be made of a metallic material, the nature of this metallic material may be selected according to the following.

The valve member contact member of the sealing device is classified as subject to a high pressure use, a medium pressure use, or a low pressure use, according as the pressure which it must withstand falls within the range of being greater than about 30 kg/cm$^2$, between about 7 and about 30 kg/cm$^2$, and less than about 7 kg/cm$^2$. The use may also be classified according to temperature as high, medium, or low temperature according as the temperature of use falls within the range of being greater than about 500° C., between about −20° to 500° C., and less than about −20° C.

In the case of a high pressure valve, the valve member contact member is preferably made of a chrome corrosion resistant steel or a nickel corrosion resistant steel since it is very apt to be subject to corrosion and abrasion by the high speed fluid.

In the case of a high temperature valve, the valve member contact member should preferably be made of a high-carbon high chrome steel or austenitic stainless steel in order to prevent particularly seizure and galling. However, in 18-8 austenitic stainless steel, carbides may be deposited in the intergranular boundary at about 500° C., thereby causing intergranular corrosion. In order to prevent this corrosion, the valve member contact member may be welded or spray welded with a high corrosion resistant metal material, for example, with a high nickel stainless alloy such as nickel - molybdenum - chrome alloy (Hastelloy B) or nickel - copper alloy (Monel metal).

In order to improve thermal resistance and abrasion resistance, and to prevent seizure, galling, and the like, the valve member contact member may be surface-treated by welding or spray welding with cobalt - chrome - tungsten alloy, nickel - chrome - boron alloy, tungsten - carbide alloy or the like.

Such welding or spray welding may also be conducted for surface hardening, which may also be effective for other embodiments of the present invention other than a high temperature valve.

In the case of a medium pressure or medium temperature valve, the valve member contact member may be made of 13% chrome steel which possesses excellent abrasion resistance and corrosion resistance, and whose tensile strength is maintained up to almost 400°–450° C.

In the case of a low pressure valve, the valve member contact member may be made of aluminium bronze, phosphorus bronze, nickel bronze, or the like, for a fluid such as water, air, or the like. Stainless steel also may be used in virtue of its non-corrosion properties and its rigidity.

In the case of a low temperature valve, the valve member contact member is preferably made of austenitic stainless steel, which has high safety.

Al, Al alloy, Cu, Cu alloy, Fe, Fe alloy, Ni, Ni alloy (Ni - Mo - Cr, Ni - Cu or the like), Pb alloy, Mg alloy, Zn alloy, Sn alloy, Ti, Ti alloy, ferritic stainless steel, martensitic stainless steel, Co - Cr - W alloy, or the like may be used other than the metallic materials described above.

The metallic material used is conveniently selected according to the fluid used, the pressure and the temperature, and the optimum material is selected in consideration of mechanical properties desired, such as coefficient of friction, abrasion resistance to the fluid and the valve member, hardness, yield point, Young's modulus, tensile strength and the like, chemical properties such as acid resistance, corrosion resistance and the like, thermal properties such as thermal expansion coefficient, thermal conductivity and the like, structural stability, ease of manufacture, economy, and the like.

Comparisons of sealing devices according to the present invention with conventional valve seals will now be described. In the following all parts and percentages are by weight unless otherwise specified.

The materials and the structures of Examples 1–8, which refer to the sealing devices of ball valves of the two nominal inches type as shown in FIG. 1, are tabulated in Table 1.

Physical and mechanical properties of the materials used in Examples 1–8 are tabulated in Tables 2–4.

The materials and the structures of the comparison examples 1–3 of conventional valves with conventional valve seals as shown in FIGS. 5 and 6 are tabulated in Table 5, and their physical and mechanical properties are tabulated in Table 6.

In Table 1:
(1) In Examples 1–4, the reinforcing ring was made of titanium;
(2) The carbonaceous material of the valve member contact member used in Examples 1–4 and Comparative Example 2 was made by the following method:

Coke (fixed carbon content 99.01%, volatile matter content 0.61%, ash content 0.25%) was ground or pulverized to a maximum particle size of 40 microns or less. To 100 parts of the resulting powdered coke was added 43 parts of binder including one part of tar and 9 parts of pitch, and this mixture was kneaded by a Banbury-type mixer with an electric power of 10 Kw per one kilogram or charge.

The kneaded mixture obtained was cooled to room temperature, repulverized and screened to less than 100 mesh (148 microns).

The repulverized powdered coke was placed in a metallic mold and compacted under a pressure of 2–4 tons/cm$^2$. The resulting compact was heated to 1300° C. at the rate of 5° C. per hour in a nitrogen gas atmosphere furnace. The carbon blocks (carbonaceous materials) obtained possessed bulk densities as tabulated in Table 2.

Figure 2I:
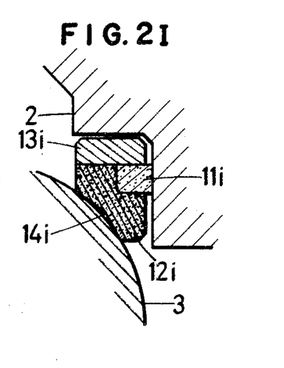

The carbonaceous materials were impregnated with the molten alloys tabulated in Table 1 in an autoclave under the pressure of 80 kg/cm$^2$ at the temperature of 450°–900° C. to obtain the valve member contact members 12$i$, 12$h$, and 12$d$ of Examples 1–3.

Further, a 50% water solution of a composition including $Al_2O_3$ and $P_2O_5$ in a ratio of 1 to 3 was prepared. The carbonaceous material was impregnated with the solution under the reduced pressure of 10 mmHg for 30 minutes and then under the pressure of 7 Kg/cm² for 10 minutes. The impregnated carbonaceous material was then dried and heated at 800° C. for 2 hours. This impregnation and drying operation was repeated three times, and thereby was obtained valve member contact member 12g of Example 4.

(3) The materials of the valve member contact member 17 of Examples 5–8 are also tabulated in Table 1.

(4) The expanded graphite compact and the expanded graphite—inorganic binder composite compact of valve body contact members 11 and 16 of Examples 1–8 were obtained by the following methods:

100 parts of natural graphite, of particle size 70%–90% between −24 and +48 mesh (700 microns to 295 microns) was reacted in a mixed solution of 920 parts of concentrated sulfuric acid and 50 parts of sodium nitrate for about 16 hours.

The acid-treated natural graphite particles were washed in water and dried at 100° C. to evaporate the water. The dried graphite particles were heated at the temperature of 1300° C. for 5 to 10 seconds, and thereby they expanded to about 300 times their original volume in the direction of the C-axes of the graphite particles. The expanded graphite was molded by compression molding under the pressure of 100 kg/cm² to obtain the valve body contact members used in Examples 1 and 5.

A graphite oxide binder was produced by the following method:

80 parts of natural graphite particles of particle size 95% less than 300 mesh, 3422 parts of concentrated sulfuric acid and 40 parts of sodium nitrate were mixed and the temperature of the solution was maintained below 0°C. by dry ice. Then 240 parts of potassium permanganate were added to the solution at the rate of 30 parts per hour.

The mixed solution was stirred for 18 hours and the temperature of the solution was raised gradually to room temperature. The mixed solution was diluted with water while generated heat was removed by ice. In order to reduce from the permanganate to manganese salt, about 10% of hydrogen peroxide was added to the solution before the purple red color of $KMnO_4$ had vanished. Thereafter washing was repeated until the solution became neutral.

To one part of the thus-obtained graphitic oxide was added 20 parts of water. The resulting dispersed graphitic oxide solution and 10 parts of the expanded graphite described above were mixed, dried at 130° C. and molded under the pressure of 100 kg/cm² to obtain the valve body contact members used in Examples 2 and 6.

To 100 parts of the expanded graphite were added 20 parts of 50% solution of boric acid in methanol solution (so that the boric acid added might be 10 parts) and the mixture was molded by compression molding under the pressure of 200 Kg/cm² at the temperature of 1300° C. for 10 minutes to obtain the valve body contact members of Examples 3 and 7.

To 100 parts of the expanded graphite were added 20 parts of 50% aluminium phosphate aqueous slurry (so that the aluminium phosphate might be 10 parts) and the mixture was molded under the pressure of 200 Kg/cm². Then the molding was heated at 600° C. for two hours to obtain the valve body contact members of Examples 4 and 8.

Figure 3A:
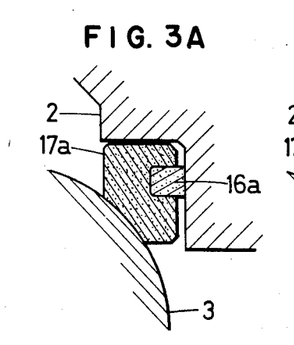
FIGS. 3A–3I are also longitudinal sectional views of further sealing devices according to the present invention.
Figure 3B:
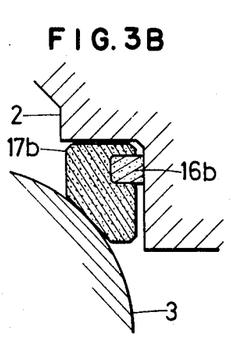
Figure 3C:
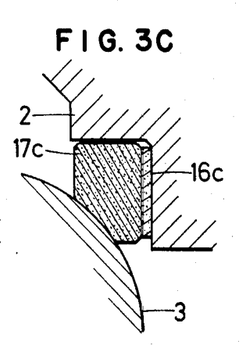
Figure 3D:
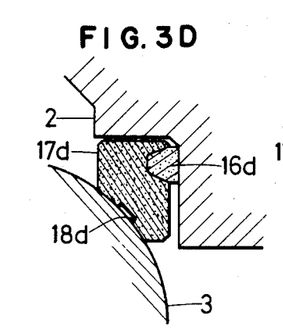
Figure 3E:
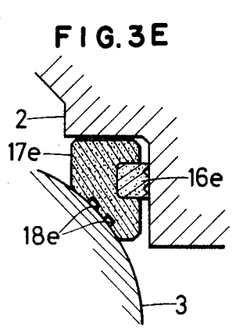
Figure 3F:
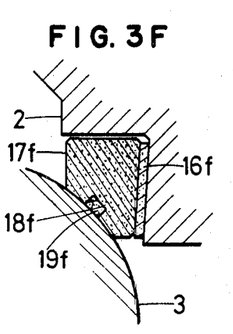
Figure 3G:
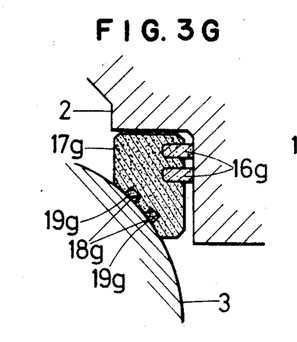
Figure 3H:
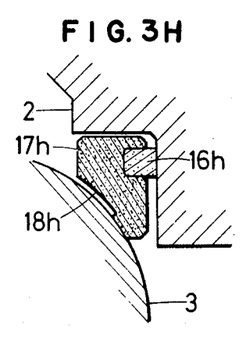
Figure 3I:
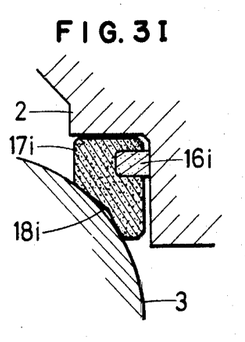

(5) The supplementary rings 15g and 19g of Examples 4 and 8 were made of the same material as the valve body contact members described above.

As apparent from Table 2, each material of the Examples has a good thermal resistance to a wide range of temperatures, a smaller expansion coefficient, a smaller frictional coefficient, and other well-balanced physical properties which meet the requirements for a sealing device for a valve, as compared with the comparative examples.

The material of valve member contact member of comparative example 1 had a poor sealing property, and thus an O-ring and a metallic plate spring were used for completion of the seal. The defects of these will hereinafter become apparent.

Five examples of each valve were prepared, and then five performance tests were run, each on a set of one example of each of the valves.

(1) Fire safety test

An object of using the sealing device of the present invention in a ball valve is that, if a fire occurs, the ball valve may not become a weak point. That is, the valve should not allow the fire to grow greatly, nor interfere with the operation of the valve.

In this test, in order to ensure the thermal resistance of other members than the sealing device, for the valve stem was used the same material as in valve member contact member 12h of Example 2. For the valve body gasket 9 was used a laminate of a carbon steel and expanded graphite composite, and for the valve stem gasket 8 was used expanded graphite composite.

The sealing devices or the valve seals of the Examples and the comparative examples were applied to ball valves.

The ball valves were set up to maintain an inner pressure of 1.8 Kg/cm², and their surfaces were heated to 1000° C. by a propane gas burner. Within 5 minutes after extinguishing the burner the following tests were conducted on each valve:

(a) The valve was opened and closed at least 3 to 5 times to check its functioning.
(b) The valve was closed and subjected to a water pressure test under the pressure of 0.7–5 kg/cm². The amount of leakage was measured.
(c) Then the valve was subjected to a leak test under water pressure of 10 kg/cm² and the amount of leakage was measured.
(d) After the tests above-described the valve was disassembled and each member was checked.

Examples 1, 2, and 4–8 passed every test. On no member was anything wrong observed after the tests, except that in the case of Examples 3 a leak from the slide contact surface was observed. The member was checked and it was found that the impregnated Sb and Sn of valve member contact member 12d had been deposited by high temperature to form porosities on the slide contact surface. Accordingly the sealing function had been lost, and there was therefore a problem with regard to fire safety in the use of the valve. Nothing wrong was observed on any of the other members of Example 3.

However, Sb and Sn, having relatively low melting points, can be well enough used in applications which are not exposed to high temperatures higher than 400° C.

In comparative example 1, water leakage was observed. The valve was disassembled and the component members were checked and it was found that the O-ring 6 was damaged badly, thereby causing a loss of sealing function. The elasticity of the metallic plate spring 5 was insufficient, and thus the spring could not maintain the appropriate surface pressure.

In comparative example 2, leakage was observed. After disassembling the valve the components were checked and it was found that the O-ring 6 and the metallic plate spring 5 were damaged, as in the comparative example 1. A lot of fine cracks were observed in valve seal 1a.

In comparative example 3 very high leakage was observed. The valve seal 1a had disappeared, due to thermal decomposition.

(2) Low temperature test

The valves were maintained under air pressure of 6 kg/cm$^2$ at $-55°$ C. and a leakage test was conducted.

The PTFE of the valve seal 1b of the valve of comparative example 3 was shrunk and accordingly the leakage was remarkable. The other valves passed the test.

(3) Hydraulic test

A water leakage test of the sealing devices of the present invention was conducted under the pressures of 18, 21, 53, 105, and 155 kg/cm$^2$.

The valves were subjected to these pressures for five minutes, and the leakage rates were measured. All the Examples and also the Comparative Examples passed this test.

(4) Air Test

A blank flange was attached to one end of the valve body and the opening was thus closed. Air pressure of 2, 6, 10, 16, or 20 kg/cm$^2$ was applied to the other end, and the valve member was opened and then closed so as to enclose the air pressure. Water was poured into the other flange, and the leakage from the seal was measured.

In the valve of comparative example 2 a leakage of more than 0.01% of the entire flow amount was observed under the pressure of 10 kg/cm$^2$. The other valves passed the test.

(5) Steam test

The valves were heated with steam of 6 kg/cm$^2$ at temperature of 158° C., 10 kg/cm$^2$ at 179° C., 15 kg/cm$^2$ at 197° C., or 20 kg/cm$^2$ at 211° C. until the valve body was heated to the same temperature as the steam, and the leakage from the seals was tested.

In comparative example 3, after steam of more than 10 kg/cm$^2$ was applied, the valve seals were deformed, and leakage was observed. The other valves passed the test. No seizure of the slide contact point was observed except in comparative example 3.

TABLE 1

| EXAMPLE NO. | VALVE BODY CONTACT MEMBER | % by weight VALVE MEMBER CONTACT MEMBER | FIG. NO. |
|---|---|---|---|
| 1 | Expanded graphite | 39% of Cu (50%) - Sn (48%) - Ti (2%) alloy impregnated carbon black | 2I |
| 2 | Expanded graphite - graphitic oxide (10%) composite compact | 22% of Al (85%) - Si (12%) - Ni (3%) alloy impregnated carbon block | 2H |
| 3 | Expanded graphite - boric acid (10%) composite compact | 35% of Sb (70%) - Sn (30%) - alloy impregnated carbon block | 2D |
| 4 | Expanded graphite - aluminium phosphate (10%) composite compact | 7% of aluminium phosphate impregnated carbon block (thrice impregnated) | 2G |
| 5 | Expanded graphite | austenitic stainless steel (SUS-304) | 3I |
| 6 | Expanded graphite - graphitic oxide (10%) composite compact | surface nitrided titanium | 3H |
| 7 | Expanded graphite - boric acid (10%) composite compact | Monel metal (Ni - Cu alloy) | 3D |
| 8 | Expanded graphite - aluminium phosphate (10%) composite compact | Hastelloy C (Ni - Mo alloy) | 3G |

TABLE 2

| | EXAMPLE | | | |
|---|---|---|---|---|
| | 1 | 2 | 3 | 4 |
| SPECIFIC GRAVITY (g/cm$^3$) of the carbon material | 1.78 | 1.65 | 1.75 | 1.70 |
| BULK DENSITY (g/cm$^3$) | 2.9 | 2.1 | 2.7 | 1.82 |
| SHORE HARDNESS | 110 | 70 | 75 | 75 |
| ELASTIC MODULUS (kg/mm$^2$) | 2100 | 2000 | 1300 | 1200 |
| FLEXURAL STRENGTH AT ROOM TEMPERATURE (kg/cm$^2$) | 2250 | 2200 | 2000 | 850 |
| FLEXURAL STRENGTH AT HIGH TEMPERATURE | 1500 | 1000 | 750 | 920 |
| COMPRESSION STRENGTH (kg/cm$^2$) | 5000 | 3400 | 3000 | 1700 |
| THERMAL EXPANSION COEFFICIENT ($\times 10^{-6}$ °C.) | 8 | 7.5 | 6 | 5 |
| USABLE TEMPERATURE RANGE (°C.) | $-200$ to 800 | $-200$ to 800 | $-200$ to 400 | $-200$ to 1300 |
| CHARPY IMPACT VALUE (kg m/cm$^2$) | 600 | 500 | 650 | 1500 |
| COEFFICIENT OF FRICTION | 0.15 | 0.18 | 0.14 | 0.12 |

TABLE 3

| | EXAMPLE | | | |
|---|---|---|---|---|
| | 5 | 6 | 7 | 8 |
| SPECIFIC GRAVITY (g/cm$^3$) | 7.9 | 4.54 | 8.84 | 8.94 |
| MELTING POINT (°C.) | 1400 | 1668 | 1300 | 1270 |
| | 1440 | 1725 | 1350 | 1310 |
| SPECIFIC HEAT (cal/g °C.) | 0.12 | 0.13 | 0.127 | 0.92 |
| THERMAL EXPANSION COEFFICIENT ($\times 10^{-6}$°C.) | 17.3 | 8.4 | 14.0 | 11.3 |
| THERMAL CONDUCTIVITY (Kcal/m.h.°C.) | 17.3 | 12.6 | 22.3 | 9.8 |
| YIELD POINT (kg/mm$^2$) | 21 | 44 | 38.7 | 33.7 |
| TENSILE STRENGTH (kg/cm$^2$) | 5700 | 5500 | 4900 | 8470 |
| ELONGATION (%) | 60 | 40 | 35 | 42 |
| YIELD STRENGTH (kg/mm$^2$) | 20 | 21 | 25 | 37.7 |
| HARDNESS (HB) | 187 | 150 | 160 | 175 |
| STATIC FRICTION COEFFICIENT WITH 18 - 8 STAINLESS STEEL (SUS-304) | 0.54 | 0.44 | 0.58 | 0.51 |

TABLE 4

|  | EXAMPLE | | | |
| --- | --- | --- | --- | --- |
|  | 1 | 2 | 3 | 4 |
| BULK DENSITY (g/cm$^3$) | 1.6 | 1.5 | 1.5 | 1.5 |
| ELASTIC MODULUS (kg/mm$^2$) | 145 | 160 | 550 | 470 |
| TENSILE STRENGTH (kg/cm$^2$) | 120 | 140 | 180 | 175 |
| COMPRESSION STRENGTH (kg/cm$^2$) | 700 | 900 | 1100 | 1050 |
| COMPRESSIBILITY (%) | 20 | 20 | 10 | 12 |
| RESILIENCE (%) | 5 | 10 | 50 | 40 |
| THERMAL EXPANSION COEFFICIENT ($\times 10^{-6}/°C.$) | 3 | 3 | 3 | 3 |
| TEMPERATURE RANGE FOR USE | −200 to 2500 | −200 to 2500 | −200 to 2000 | −200 to 1300 |
| COEFFICIENT OF FRICTION | 0.2 | 0.15 | 0.11 | 0.12 |

TABLE 5

| COMPARATIVE EXAMPLE NO | VALVE BODY CONTACT MEMBER MATERIAL | VALVE MEMBER CONTACT MEMBER MATERIAL | FIG. NO. |
| --- | --- | --- | --- |
| 1 | Combination of Metallic Spring (spring steel) and silicon rubber o - ring | Stainless steel (SUS-304) | 5 |
| 2 | Same as 1 | Phenol Resin Impregnated Carbon Material (10%) | 5 |
| 3 | PTFE | PTFE | 6 |

TABLE 6

|  | COMPARATIVE EXAMPLE | | |
| --- | --- | --- | --- |
|  | 1 | 2 | 3 |
| SPECIFIC GRAVITY (g/cm$^3$) | 7.9 | 1.8 | 2.17 |
| THERMAL RESISTANCE TEMPERATURE (°C.) | −100 to 810 | −50 to 200 | −50 to 260 |
| SPECIFIC HEAT (cal/g °C.) | 0.12 | 0.2 | 0.25 |
| THERMAL EXPANSION COEFFICIENT ($\times 10^{-6}/°C.$) | 17.3 | 6.5 | 110 |
| THERMAL CONDUCTIVITY (kcal/m.h. °C.) | 10 | 110 | 0.22 |
| TENSILE STRENGTH (kg/cm$^2$) | 5700 | 650 | 105 to 210 |
| COMPRESSION STRENGTH (kg/cm$^2$) | 5250 | 1700 | 120 |
| ELONGATION (%) | 60 | 0.5 | 100 to 300 |
| HARDNESS (HB) | 187 | 650 | 55 Shore D hardness |
| COEFFICIENT OF FRICTION | 0.54 | 0.15 | 0.04 |

What is claimed is:

1. A sealing device for a valve comprising a valve body and a valve member, which is adapted to be situated between the valve body and the valve member, comprising:

a valve body contact member;

and a valve member contact member situated between said valve member and said valve body contact member, said valve body contact member including a surface facing and engaging said valve body, said surface in assembly being uniformly compressed against said valve body;

wherein the material from which the valve body contact member is fabricated consists of an expanded graphite compact having a bulk density no less than 1.1 gm/cm$^3$; and wherein the material from which the valve member contact member is fabricated consists of a carbonaceous material/metallic material composite in which said metallic material is represented in amounts equal to 10–40% by volume of the entire amount.

2. A sealing device according to claim 1, wherein the carbonaceous material of the carbonaceous material—metallic material composite, which is used, is selected from the group consisting of a non-graphitic carbonaceous material and a graphitic carbonaceous material excluding expanded graphite.

3. A sealing device according to claim 1, wherein the metallic material of the carbonaceous material metallic material composite, which is used, has a melting point of from 200° to 1300° C.

4. A sealing device according to claim 1, wherein a wetting agent for the carbonaceous material, selected from the group consisting of titanium and zirconium, is added to the carbonaceous material metallic material composite, which is used.

5. A sealing device according to claim 4, wherein the wetting agent is used in amounts of 0.5% to 25% by weight of the metallic material.

6. A sealing device according to claim 1, wherein the valve body contact member is fitted into and extends from the valve member contact member.

7. A sealing device according to claim 1, wherein the valve body contact member is attached to and extends from the valve member contact member.

8. A sealing device according to claim 1, wherein the valve body contact member includes at least one groove on its contact surface to the valve body.

9. A sealing device according to claim 1, wherein the valve body contact member is divided into several sealing pieces arranged substantially concentrically to one another around an axis of symmetry.

10. A sealing device according to claim 1, wherein the valve member contact member is formed with at least one annular groove in its contact surface with the valve member.

11. A sealing device according to claim 10, wherein only one annular groove is provided and wherein one side of the groove opens outwards so that the groove is provided as a depression with one side wall.

12. A sealing device according to claim 10, wherein the annular groove has a V-shaped cross section.

13. A sealing device according to claim 10, wherein the annular groove has a rectangular cross-section.

14. A sealing device according to claim 13, wherein at least one of the possibly plural annular grooves has a supplementary ring inserted into it.

15. A sealing device according to claim 14, wherein the supplementary ring is made of a material selected from the group consisting of
  (a) an expanded graphite compact; and
  (b) an expanded graphite—inorganic binder composite compact.

16. A sealing device according to claim 1, wherein an annular reinforcing ring is provided around the combination of said valve body contact member and valve member contact member.

17. A sealing device according to claim 1, which is used in a ball valve.

18. A ball valve comprising a sealing device according to claim 1.

* * * * *